US010296088B2

(12) United States Patent
Mazzola

(10) Patent No.: US 10,296,088 B2
(45) Date of Patent: May 21, 2019

(54) HAPTIC CORRELATED GRAPHIC EFFECTS

(71) Applicant: Futurewei Technologies, Inc., Plano, TX (US)

(72) Inventor: Anthony Mazzola, Ramona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 103 days.

(21) Appl. No.: 15/006,888

(22) Filed: Jan. 26, 2016

(65) Prior Publication Data

US 2017/0212592 A1 Jul. 27, 2017

(51) Int. Cl.
*G06T 13/40* (2011.01)
*G06F 3/01* (2006.01)
*G06T 3/00* (2006.01)
*G06T 13/20* (2011.01)
*G09G 5/00* (2006.01)
*G06T 13/80* (2011.01)
*G06F 3/0481* (2013.01)

(52) U.S. Cl.
CPC ............ *G06F 3/016* (2013.01); *G06F 3/0481* (2013.01); *G06T 3/0093* (2013.01); *G06T 13/20* (2013.01); *G06T 13/80* (2013.01); *G09G 5/00* (2013.01); *G06F 2203/04803* (2013.01); *G09G 2340/14* (2013.01)

(58) Field of Classification Search
None
See application file for complete search history.

(56) References Cited

U.S. PATENT DOCUMENTS

| | | | | | |
|---|---|---|---|---|---|
| 4,689,677 | A | * | 8/1987 | Hedley | H04N 5/272 345/419 |
| 5,619,628 | A | * | 4/1997 | Fujita | G06T 13/20 345/419 |
| 5,689,437 | A | * | 11/1997 | Nakagawa | G06T 13/20 345/421 |
| 5,986,675 | A | * | 11/1999 | Anderson | G06T 13/20 345/473 |
| 6,008,818 | A | * | 12/1999 | Amakawa | G06T 13/00 345/473 |
| 6,064,354 | A | * | 5/2000 | DeLuca | G02B 27/22 345/419 |

(Continued)

FOREIGN PATENT DOCUMENTS

| | | |
|---|---|---|
| CN | 103164118 A | 6/2013 |
| CN | 104820493 A | 8/2015 |
| WO | WO-2014/069917 A1 | 5/2014 |

OTHER PUBLICATIONS

Zip,How to Create a Ripple Effect, Dec. 2000,QB Cult Magazine, http://www.petesqbsite.com/sections/tutorials/zines/qbcm/7-ripple.html.*

(Continued)

*Primary Examiner* — Martin Mushambo
(74) *Attorney, Agent, or Firm* — Schwegman Lundberg & Woessner, P.A.

(57) ABSTRACT

A method includes dividing a display of an electronic device into multiple regions defined by vertices, calculating time varying positions for each vertex relative to a z dimension, and composing a screen for the display that includes the varying positions for each vertex to create an animated display distortion. The distortion may occur in association with haptic effects.

19 Claims, 6 Drawing Sheets

(56) References Cited

U.S. PATENT DOCUMENTS

| | | | | |
|---|---|---|---|---|
| 6,215,495 | B1* | 4/2001 | Grantham | G06T 15/00 345/419 |
| 6,236,401 | B1* | 5/2001 | Cronin | G06T 13/00 345/418 |
| 6,285,351 | B1* | 9/2001 | Chang | G06F 3/011 345/156 |
| 6,307,561 | B1* | 10/2001 | Doi | G06T 13/80 345/473 |
| 6,369,812 | B1* | 4/2002 | Iyriboz | A61B 6/463 345/419 |
| 6,466,229 | B1* | 10/2002 | Nagao | G06T 1/60 345/621 |
| 6,473,083 | B1* | 10/2002 | Suzuki | G06T 13/00 345/426 |
| 6,507,345 | B1* | 1/2003 | Tojo | G06F 3/04812 345/157 |
| 6,847,359 | B1* | 1/2005 | Ono | G06T 17/10 345/419 |
| 6,954,196 | B1* | 10/2005 | Lipscomb | G06F 9/4443 345/156 |
| 7,184,041 | B2* | 2/2007 | Heng | G06T 15/04 345/424 |
| 7,275,219 | B2* | 9/2007 | Shoemaker | G06T 3/0018 345/660 |
| 7,643,025 | B2* | 1/2010 | Lange | G02B 27/22 345/419 |
| 8,279,168 | B2* | 10/2012 | Glomski | G06F 3/011 345/156 |
| 8,947,430 | B1* | 2/2015 | Green | G06T 13/20 345/426 |
| 8,957,847 | B1* | 2/2015 | Karakotsios | G06F 3/013 345/156 |
| 9,706,962 | B1* | 7/2017 | Uehara | A61B 5/7267 |
| 2003/0080959 | A1* | 5/2003 | Morein | G06T 15/405 345/422 |
| 2003/0095109 | A1* | 5/2003 | Sasaki | G06F 3/03542 345/173 |
| 2003/0117528 | A1 | 6/2003 | Liang et al. | |
| 2003/0151606 | A1* | 8/2003 | Morein | G06T 15/405 345/422 |
| 2003/0179193 | A1* | 9/2003 | Adams, Jr. | G06T 15/205 345/419 |
| 2004/0027352 | A1* | 2/2004 | Minakuchi | G06T 13/40 345/473 |
| 2004/0036693 | A1* | 2/2004 | Yoon | G06T 3/403 345/582 |
| 2005/0083400 | A1* | 4/2005 | Hirayama | H04N 13/04 348/14.07 |
| 2005/0259076 | A1* | 11/2005 | Hayasaka | G06F 3/016 345/161 |
| 2006/0145945 | A1* | 7/2006 | Lewis | G02B 26/101 345/7 |
| 2006/0164427 | A1* | 7/2006 | Cook | G06T 15/04 345/581 |
| 2006/0170696 | A1* | 8/2006 | Ahn | G06T 11/001 345/582 |
| 2006/0274070 | A1* | 12/2006 | Herman | A63F 13/10 345/474 |
| 2007/0126732 | A1* | 6/2007 | Robertson | G06T 15/503 345/419 |
| 2007/0206016 | A1* | 9/2007 | Szymanski | G06T 13/20 345/473 |
| 2008/0165195 | A1* | 7/2008 | Rosenberg | G06T 13/40 345/473 |
| 2008/0293488 | A1* | 11/2008 | Cheng | A63F 13/10 463/31 |
| 2009/0051653 | A1* | 2/2009 | Barney | A63F 13/06 345/158 |
| 2009/0140960 | A1* | 6/2009 | Mahowald | G06F 11/325 345/83 |
| 2009/0174650 | A1* | 7/2009 | Choi | G06F 3/0418 345/104 |
| 2009/0195538 | A1* | 8/2009 | Ryu | G06F 3/016 345/419 |
| 2009/0244072 | A1* | 10/2009 | Pugach | G06T 13/00 345/475 |
| 2009/0309882 | A1* | 12/2009 | Kanyuk | G06T 13/20 345/474 |
| 2010/0046790 | A1* | 2/2010 | Koziol | G06F 21/36 382/100 |
| 2010/0104162 | A1* | 4/2010 | Falk | G06T 19/00 382/131 |
| 2010/0110072 | A1* | 5/2010 | Nakayama | G06F 3/04815 345/419 |
| 2010/0227640 | A1* | 9/2010 | Kim | H04M 19/04 455/550.1 |
| 2010/0315414 | A1* | 12/2010 | Lowe | G06F 3/012 345/419 |
| 2011/0043537 | A1* | 2/2011 | Dellon | G09B 9/00 345/647 |
| 2011/0090255 | A1* | 4/2011 | Wilson | G06F 3/04817 345/647 |
| 2011/0102462 | A1* | 5/2011 | Birnbaum | G06F 3/04886 345/647 |
| 2011/0109616 | A1* | 5/2011 | Ernst | A61C 9/006 345/419 |
| 2011/0261002 | A1* | 10/2011 | Verthein | G06F 1/181 345/174 |
| 2012/0001907 | A1* | 1/2012 | Wilkinson | H04N 13/0275 345/419 |
| 2012/0092340 | A1* | 4/2012 | Sarnoff | G06T 11/203 345/420 |
| 2012/0114144 | A1* | 5/2012 | Hakoda | G10L 13/033 381/107 |
| 2012/0176401 | A1* | 7/2012 | Hayward | G06T 3/0093 345/619 |
| 2012/0256967 | A1* | 10/2012 | Baldwin | G06F 3/013 345/684 |
| 2012/0268369 | A1* | 10/2012 | Kikkeri | G06F 3/038 345/157 |
| 2012/0306632 | A1* | 12/2012 | Fleizach | G06F 3/016 340/407.2 |
| 2013/0069956 | A1* | 3/2013 | Tristram | G06T 13/20 345/473 |
| 2013/0088491 | A1* | 4/2013 | Hobbs | G06T 13/80 345/423 |
| 2013/0120386 | A1 | 5/2013 | Wilensky et al. | |
| 2013/0321442 | A1* | 12/2013 | Van Os | G09G 5/00 345/582 |
| 2014/0049491 | A1* | 2/2014 | Nagar | G06F 3/016 345/173 |
| 2014/0092115 | A1* | 4/2014 | Mazzola | G09G 5/37 345/589 |
| 2014/0152623 | A1* | 6/2014 | Lee | G06F 3/042 345/175 |
| 2014/0176477 | A1* | 6/2014 | Nakao | G06F 3/0416 345/173 |
| 2014/0267313 | A1* | 9/2014 | Marsella | G06T 13/40 345/474 |
| 2014/0267437 | A1* | 9/2014 | Mazzola | G09G 5/373 345/661 |
| 2015/0138155 | A1* | 5/2015 | Bernstein | G06F 3/0412 345/174 |
| 2015/0149967 | A1* | 5/2015 | Bernstein | G06F 3/0482 715/854 |
| 2015/0154769 | A1* | 6/2015 | Anderson | H04W 4/02 345/441 |
| 2016/0267705 | A1* | 9/2016 | O'Leary | G06F 3/04815 |
| 2017/0185151 | A1* | 6/2017 | Pahud | G06F 3/016 |
| 2017/0330351 | A1* | 11/2017 | Tremblay | G06T 11/203 |
| 2018/0018802 | A1 | 1/2018 | Cao | |

OTHER PUBLICATIONS

"Shake animation to a UIView or UIButton", [online]. Youtube Video Clip. Retrieved from the Internet: <URL: https://www.youtube.com/watch?v=X3xNzTzpYRs>, (Sep. 20, 2012).

(56) References Cited

OTHER PUBLICATIONS

"International Application Serial No. PCT/CN2017/071765, International Search Report dated Apr. 21, 2017", 3 pgs.

"International Application Serial No. PCT/CN2017/071765, Written Opinion dated Apr. 21, 2017", 4 pgs.

"Prakash Blog: Shake animation in android", (C) Prakash Creative. [online]. Retrieved from the Internet: <URL: http://www.tejaprakash.com/2013/07/shake-animation-in-android.html>, (Jul. 20, 2013), 3 pgs.

"Shake animation to a UIView or UIButton", [online]. Retrieved from the Internet: <URL: https://www.youtube.com/watch?v=X3xNzTzpYRs>, (Sep. 20, 2012), 2 pgs.

"European Application Serial No. 17743656.5, extended European Search Report dated Apr. 12, 2018", 10 pgs.

Johanson, Claes, et al., "Rea-time water rendering Introducing the project grid concept", Master of Science Thesis, (Mar. 2004), 42 pgs.

\* cited by examiner

```
912~ void main()
     {
914~ vec2 position = a_position/ScreenSize + vec2(TIME, 0.0);
916~ vec4 noise = texture2D(NoiseTexture, position);
918~ float intensity = abs(noise[0] - 0.25)
920~ + abs(noise[1] - 0.125)
922~ + abs(noise[2] - 0.0625)
924~ + abs(noise[3] - 0.03125);
926~ float shake = intensity * SINTHETA * DEPTH;
928~ gl_Position = vec4(a_position, Z+shake*INTENSITY, 1) * MVPMatrix;
     }
```

HAPTIC CORRELATED GRAPHIC EFFECTS

TECHNICAL FIELD

The present application is related to graphic effects on a display, and in particular to haptic correlated graphic effects.

BACKGROUND

Current mobile phones utilize shake animations that are implemented as translations of a view. Visually, it appears as if the entire view is moved from side to side.

SUMMARY

A method includes dividing a display of an electronic device into multiple regions defined by vertices, calculating time varying positions for each vertex relative to a z dimension, and composing a screen for the display that includes the time varying positions for each vertex to create an animated display distortion.

A machine readable storage device having instructions for execution by a processor to cause the machine to perform operations. The operations include dividing a display of an electronic device into multiple regions defined by vertices, calculating time varying positions for each vertex relative to a z dimension, and composing a screen for the display that includes the time varying positions for each vertex to create an animated display distortion.

A device includes a processor, a display coupled to the processor, and a memory device coupled to the processor and having a program stored thereon for execution by the processor to perform operations. The operations include dividing the display into multiple regions defined by vertices, calculating time varying positions for each vertex relative to a z dimension, and composing a screen for the display that includes the time varying positions for each vertex to create an animated display distortion.

DETAILED DESCRIPTION

Figure 1A:
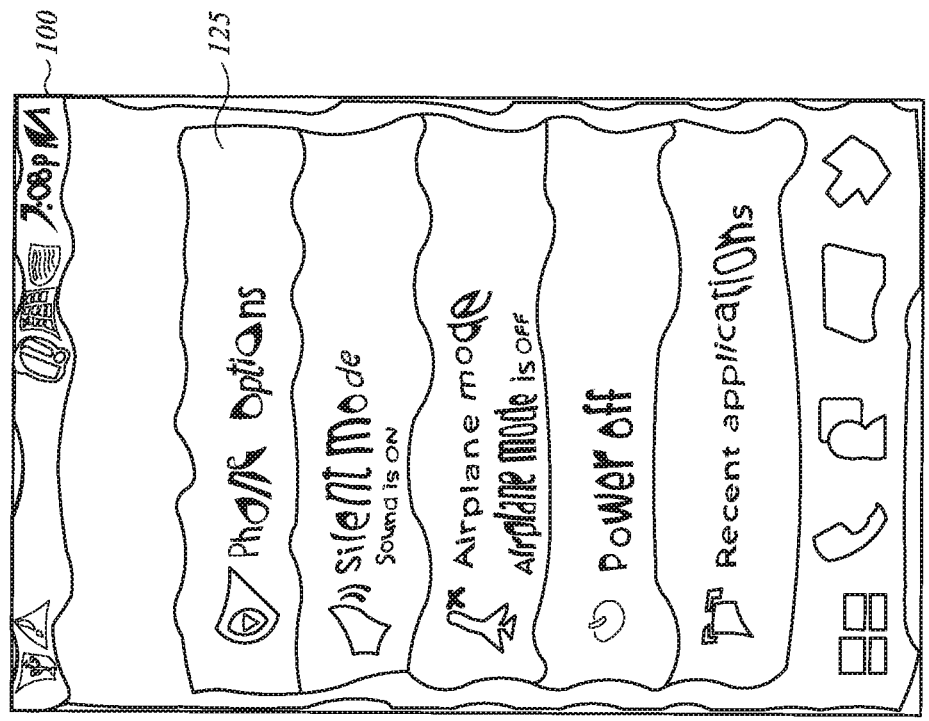
FIG. 1A is a block diagram illustrating graphic effects on a mobile device display according to an example embodiment.
Figure 1A:
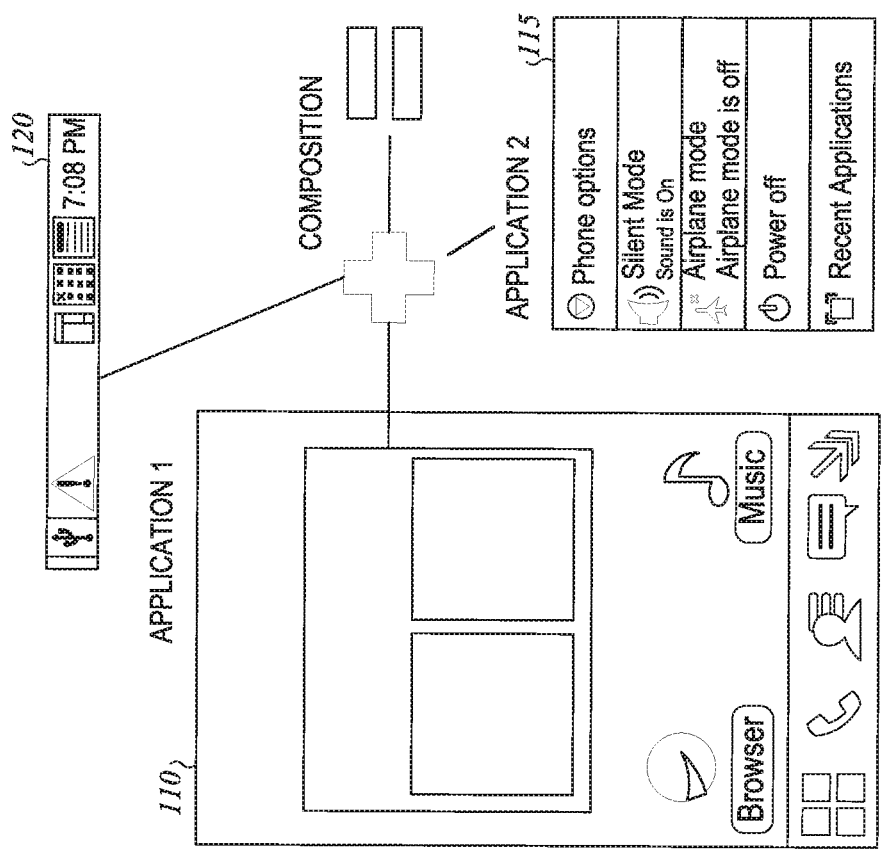

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor. ASIC, microprocessor, or other type of processor operating on a computer system, such as a personal computer, server or other computer system, turning such computer system into a specifically programmed machine.

A screen (user interface) to be displayed on a display of a hand held device is divided into multiple regions, such as rectangles, triangles or other applicable shapes. These regions may be arranged non-overlapping and/or without gaps over the screen (or a representation of the screen to be displayed). A shape may be bounded by edges and vertices (or the points where edges meet). For example, the rectangles can be defined by vertices (corners of regions). Each rectangle includes multiple pixels. Over time, the vertices are transformed or distorted in a manner to simulate vibration of the regions towards or away from a user viewing the display. The screen for the display includes the transformed vertices to create an animated display distortion in association with the occurrence of haptic effects for the mobile device. In one embodiment, the animated display coincides with the haptic effects to provide a visual indication of an alert or other notification while the haptic effects are occurring, or in place of the haptic effects. The display appears to a viewer as a perspective projection where parts of the display are enlarged or shrunken in size, creating a distortion of the display. The distortions may utilize Perlin noise as a wave function to both prevent the projection from looking too perfect to a user and to create a rolling appearance of the projection on the display.

A typical user interface is the result of composing multiple application generated surfaces or layers. A graphical co-processor may be used to implement the composing of the layers into an animated display. The graphical co-processor may also be used to add the distortion effects during composition. The animated display distortion provides a three dimensional graphical effect, providing a better visual representation of haptic effects on the device.

FIG. 1A is a block diagram illustrating graphic effects 100 on a mobile device display according to an example embodiment. Several display elements 110, 115, and 120 are generated by applications and operating system code running on the mobile device. Display element 110 is a surface generated by a first application. Display element 115 is a surface generated by a second application, while display element 120 is a status bar which may be generated by other code, such as operating system code, running on the mobile device.

The display elements are composed by the mobile device and displayed on a display of the mobile device. Distortions are applied in one embodiment, resulting in the graphic effects 100. In one embodiment, graphic effects 100 as shown are a captured frame at one point in time. The distortions result in parts of the screen appearing closer or further away to a user viewing the display. In one embodiment, the display is divided into 32×48 regions or more. The distortions are applied across the screen in accordance with a function such that parts appearing closer in one part of the screen gradually transition to parts appearing further away. For instance, the words "Phone Options" appears generally at 125. The "P" in the words "Phone Options" appears further away than the "o" and the "n". The "P" may be presented within a single region or multiple regions. These variations in perspective ("z" distance—from a user or camera perspective) appear across the entire screen in one embodiment and may vary in both the "x" and "y" directions of the screen. Note that "x" and "y" dimensions corresponding to left and right, and up and down directions on the display, while the "z" dimension corresponds to the appearance of depth into and out of the display from the perspective of a user or camera, or the users depth perception of objects on the screen. User interface functions associated with the display elements can be independent of whether the display elements are distorted or not.

Figure 1B:
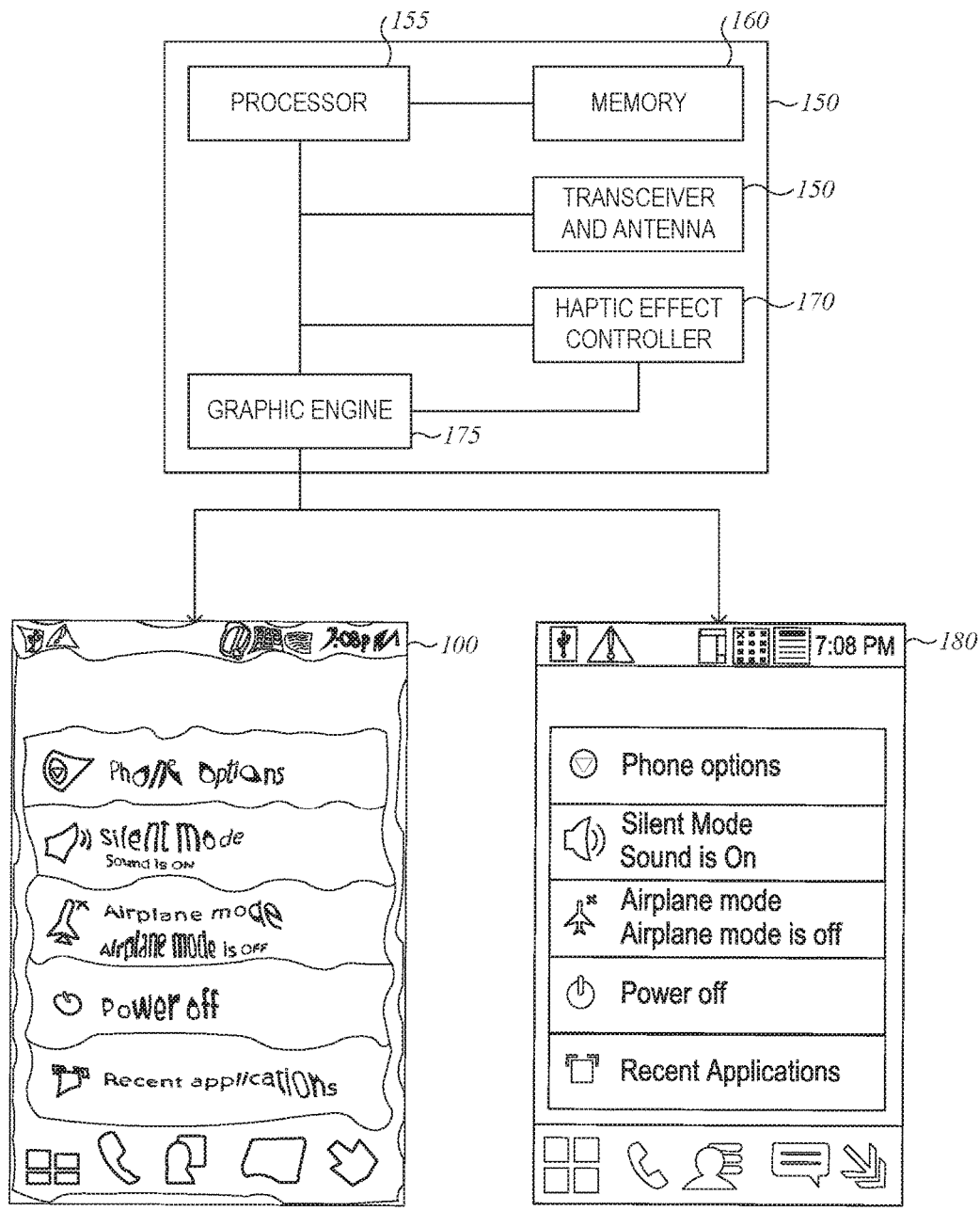
FIG. 1B is a block diagram illustrating a mobile device that generates graphic effects on the mobile device display in coordination with haptic effects occurring on the mobile device according to an example embodiment.

FIG. 1B is a block diagram illustrating a mobile device 150 that generates graphic effects 100 on the mobile device display in coordination with haptic effects occurring on the mobile device 150. Mobile device 150 is shown in simplified form and may include a processor 155 coupled to a memory device 160 that stores applications, data, and other code for execution on the processor 155. A transceiver 165 is coupled to the processor 155 to provide wireless communications via one or more wireless networks. The transceiver 165 may include one or more antennas for transmitting and receiving wireless communications. A haptic effect controller 170 may also be coupled to the processor 155 and controls the provision of haptic effects, such as mechanical vibrations responsive to alarms or other notifications occurring on mobile device 150, such as the receipt of a phone call, email, text message, or other event. The haptic effects may be configured via a user interface to occur for selected events. The user interface may simply be a list of events with check boxes for the types of effects desired for each event, such as "ring tone" "vibrate" "graphic distortion", allowing the user to select one or more such effects. The controller 170 may be software code for execution on processor 155 to provide signals to control provision of the graphic effects responsive to user selections. A graphics engine 175 may include programming code that runs on processor 155 or a graphics processor within engine 175 to generate graphic effects responsive to the controller 170.

In one embodiment, the haptic effects are correlated with the graphic effects 100. If an event, such as a phone call, initiated haptic effects, the graphics engine 175 is controlled via controller 170 to produce the graphic effects 100. If the event does not trigger the haptic effects, the graphics engine 175 may exclude the distortions, resulting in an undistorted display as indicated at 180. In further embodiments, the graphic effects may be produced independently of the haptic effects, or selectively as controlled by user preferences. For instance, the user may simply want to include the graphic effect with or without haptic effects, and with or without a ringtone for different events, such as receipt of a phone call, text message, email, or other notification generated by one of many different applications.

Figure 2:
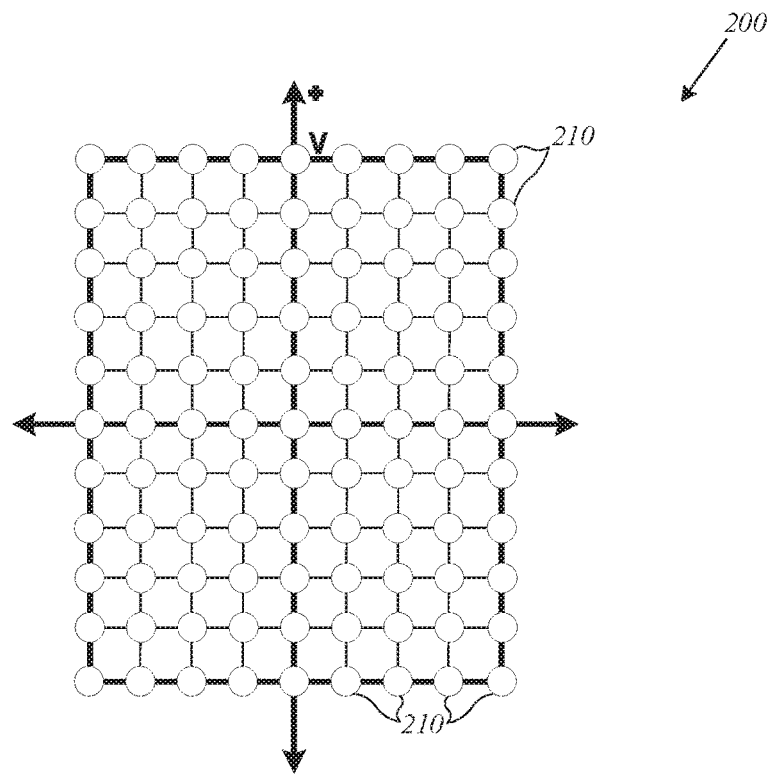
FIG. 2 is a block diagram of a tessellation grid that divides a display into regions defined by vertices according to an example embodiment.

FIG. 2 is a block diagram of a tessellation grid 200 that shows an array of 8×10 regions. Corners of the regions are indicated at 210 in the "x" and "y" dimensions. The haptic effects for a graphics display may be generated based on a model emulating the visual effect as if a screen were placed on top of a shaker bed consisting of multiple pistons arranged according to the tessellation grid, the graphics display displayed on the screen while the pistons moving up and down, each piston corresponding to a circle in the grid 200.

The corners 210 correspond to vertices. Each vertex 210 is drawn as a circle to emulate a single piston moving up and down, causing the surface above it to change in size, appearing to move closer and further away from a user viewing the screen. In actuality, each vertex is a point, and is only drawn as a circle to invoke the piston based model. Thus, each vertex is effectively moved by each piston, and the regions between the vertices effectively tilt between the vertices such that the distortions stretch across the regions.

Figure 3:
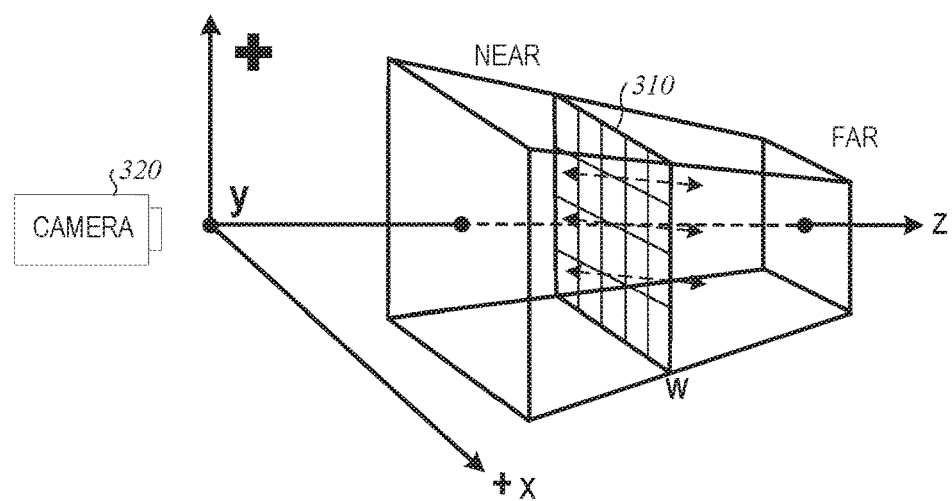
FIG. 3 is a block diagram illustrating perspective projections of a display according to an example embodiment.

FIG. 3 is a block diagram illustrating perspective projections of the display at 300. The same coordinate system is used, having x, y, and z dimensions, with z being a distance of portions of a display 310 from a viewer represented as a camera 320. When a vertex is pushed by the piston toward a viewer, the area around the vertex is made larger to appear closer to the viewer. When a vertex is moved by the piston away from the viewer, the area around the vertex is made smaller to appear further away from the viewer. The piston-like effect on the vertices creates a distortion of the display. Distorting the z coordinate inside a vertex shader executing on the engine 175 prior to applying the projection matrix may be done to implement the effect. A vertex shader is a graphics function that transforms each vertex's 3D position in virtual space to the 2D coordinate at which it appears on the display.

Figure 4:
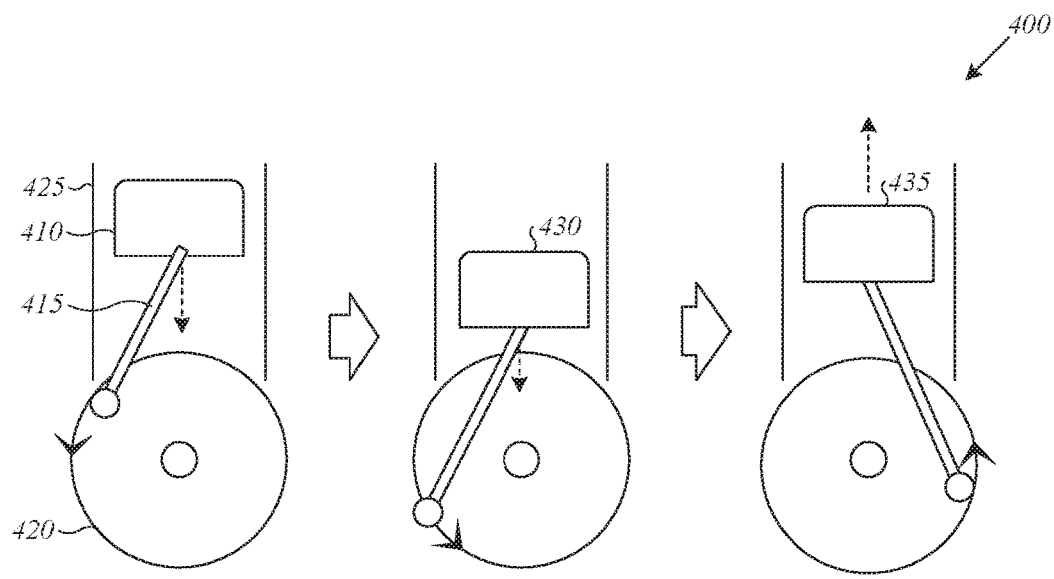
FIG. 4 is a representation of motion of a piston for modeling oscillation of the vertices according to an example embodiment.

FIG. 4 is a representation 400 of motion of a piston 410 for modeling oscillation of a vertex. The piston 410 is coupled to a piston rod 415 that rotates around an axis as indicated at 420, causing the piston 410 to move up and down within a cylinder 425. The piston 410 is represented in different positions at 430 and 435 in a time sequence of images in FIG. 4, with arrows representing the direction of rotation of the axis and movement of the piston.

Figure 5:
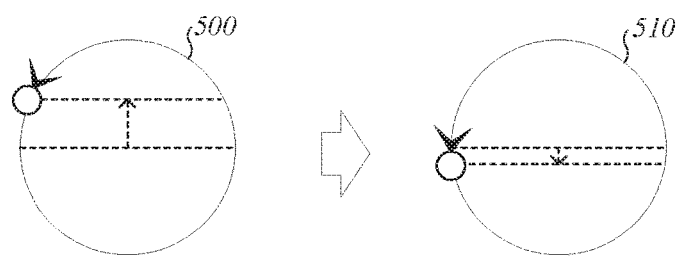
FIG. 5 is a representation of calculations to determine distance simplified to be the distance between a rod position and a center of the axis or axle according to an example embodiment.

In one embodiment, the position of the piston is a representation of the "z" associated with a vertex of the display. Variation of the "z" (in time) can be modeled according to the movement of the position of the piston. The "z" can be determined in a simplified manner according to the distance between the rod 415 position and a center of the axis or axle as represented in two example positions 500 and 510 in FIG. 5.

Figure 6:
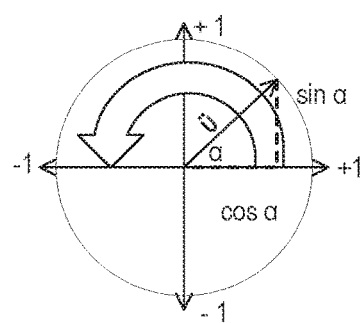
FIG. 6 is a block diagram representation of calculating the distance between the rod position and center of the axle using a sin function according to an example embodiment.

FIG. 6 is a block diagram representation 600 of calculating the distance between the rod 415 position and center of the axle using a sine function, where the distance or height is the sine of the angle of the rod with respect to the axle, varying between −1 and 1. A cosine function may be used in further embodiments depending on the axis selected as zero degrees of rotation.

In one embodiment, the length of each piston rod varies over time using a Perlin noise pattern having a turbulence function calculated from four frequencies of noise. This is done by subtracting an absolute value of each frequency from the center value. The resulting distortion of the screen over time may be referred to as an animation. As the animation time increases, the mapping between pistons and the noise function shifts to the right to create a wave effect, as the haptic effect travels through the device. The animation may be correlated with the vibrations of the haptic effect.

Figure 7:
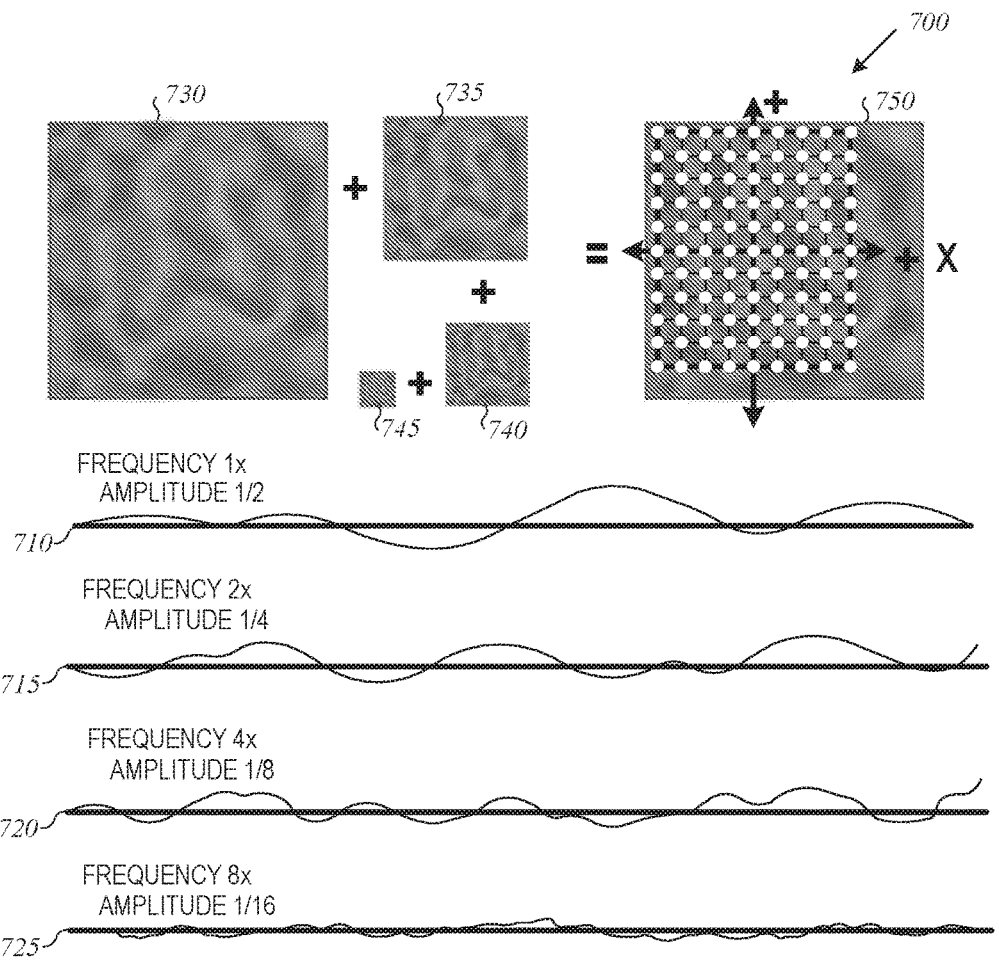
FIG. 7 is a hybrid block diagram and graphic representation of application of a Perlin noise function according to an example embodiment.

FIG. 7 is a hybrid block diagram and graphic representation 700 of the application of the Perlin noise function described above. The four frequencies of noise are represented at 710, 715, 720, and 725. In one embodiment, the frequencies double while the amplitude is reduced by half for each of the four frequencies of noise as indicated on the graphs of the noise. The resulting effect is represented at corresponding graphical representations (surfaces) of frequencies of noise 730, 735, 740, and 745, where the noise frequencies are extended to a third dimension. The frequencies of noise are combined with the tessellated vertices at 750 to provide the animation applied to the screen. In one embodiment, surface 730 is applied to the tessellated vertices at 750. Surface 735 is applied to each quadrant of surface 730, surface 740 is applied to each quadrant of surface 735, and surface 745 is applied to each quadrant of surface 740 such that each surface is applied to all the tessellated vertices.

Figure 8:
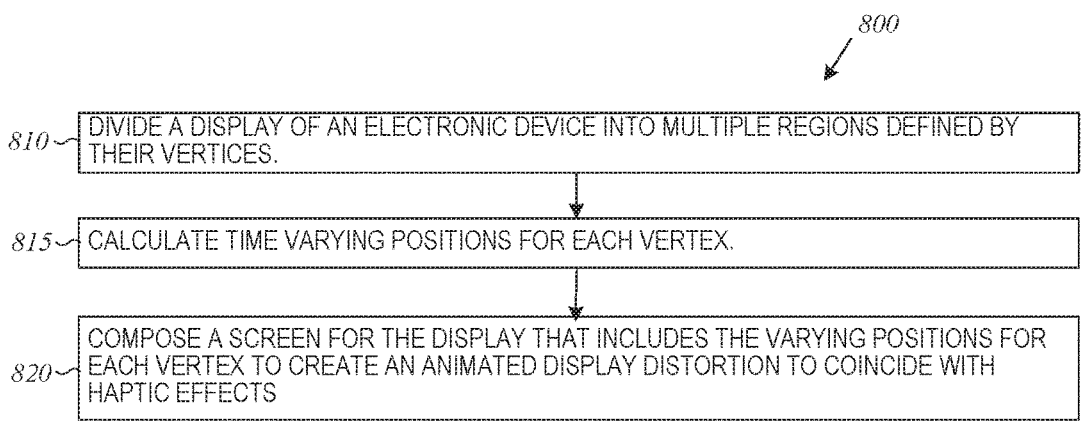
FIG. 8 is a flowchart of a method of providing animation according to an example embodiment.

A simplified flowchart of a method 800 of providing animation is shown in flowchart form in FIG. 8. Method 800 in one embodiment includes dividing a display of an electronic device into multiple regions at 810 defined by their vertices. At 815, time varying positions for each vertex time are calculated. At 820, a screen is composed for the display that includes the varying positions for each vertex to create an animated display distortion in association with the haptic effects. Method 800 may be triggered by any event giving rise to the generation of haptic effects of the mobile device, such as when the device is placed in vibrate mode for incoming calls or other alerts.

In one embodiment, composing the screen includes adding the time varying positions for each vertex to a screen display generated by an application running on the electronic device. The varying positions for each portion are calculated to provide a visual wave effect in a further embodiment. The varying positions may vary between enlarged and shrunken, creating a distortion in the display. A Perlin noise function as described above may be added to the time varying positions in further embodiments. An intensity value may be used to transition the distortions on and off in a graceful manner as opposed to an on/off step function.

Figures 9, 10:
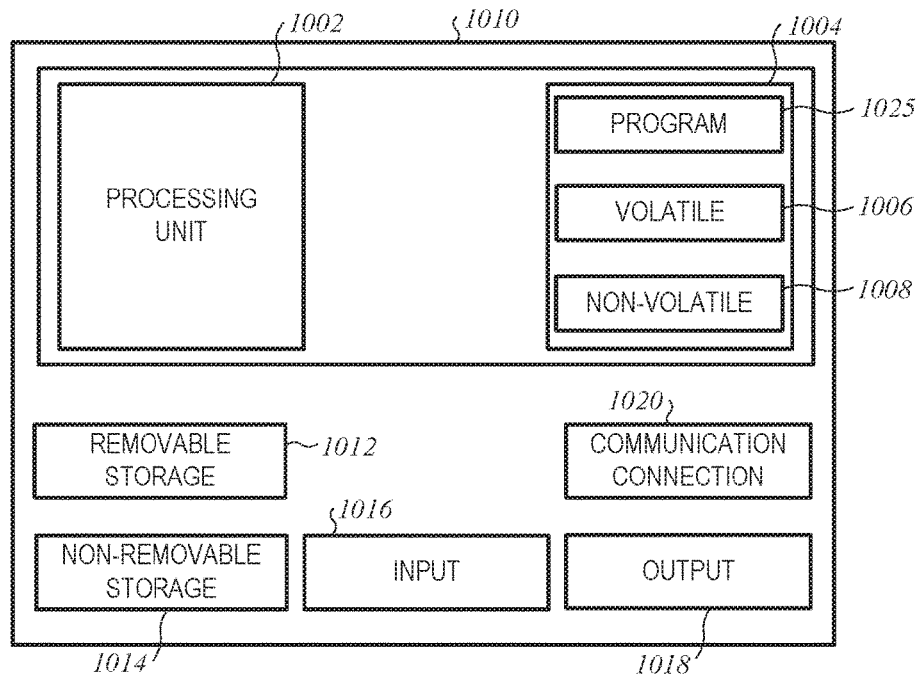
FIG. 9 illustrates an example of GL shading language (GLSL) code for providing an animation of the screen according to an example embodiment.
FIG. 10 is a block schematic diagram of a computer system to implement methods according to an example embodiment.

FIG. 9 illustrates example GL shading language (GLSL) code 900 for providing an animation of the screen. GLSL is a high level shading language designed to provide programmers better control of a graphics pipeline for modifying presentation of surfaces on a display.

Input variables used in code 900 include:

Z—A constant that defines the z-position where the display is located in the model (depth of no distortion)

a_position—A 2d position of a vertex on the display (defined in screen coordinates . . . pixel #'s)

NoiseTexture—The bound texture sampler that contains the Perlin noise pattern.

Each fragment from the textures is a vector4, with each element containing a different frequency.

INTENSITY—A variable passed in that defines the current intensity of the effect. The intensity can vary from 0 . . . 1. (0 is off, 1 is full intensity)

DEPTH—The default length of a piston.

MVPMatrix—A 4×4 matrix containing a perspective transformation between 3d and 2d.

In one embodiment, code 900 is a vertex shader (to perform a vertex shader function), which is executed to determine the position of the modeling piston of FIG. 4 defining the distortion of a screen. At line 912, a void type of main is specified, providing an entry point to the vertex shader program. At 914, a vector is specified providing locations for the portions of the screen. The screen size and time are also specified to make the effect appear to walk across the screen. The time may vary from 0 to n, with n in one example being 500 msec.

Noise functions are specified at 916 for the four noise waveforms described above that provide a Perlin noise texture. At 918, a float intensity of 0-1 is defined, which corresponds to the turbulence function. The float intensity is comprised of four components, one of which is included in line 918 and three more are specified at 920, 922, and 924, corresponding to the four different waveforms of noise. Lines 918, 920, 922, and 924 add an absolute value of each of the four components of noise to provide each piston with a different radius reflecting the noise, which means a different amount of shift in the z-axis.

A float shake is described at 926, which effectively changes the length or throw of the piston over time. The term "SINTHETA" corresponds to animation between −1 and +1, and "DEPTH" is the maximum length of travel of the piston. Line 928 is used to specify the x,y position on the screen and blend the effect during z direction movement to provide a smooth transition between the portion appearing near and far, transforming the x,y pixels to provide a varying perspective. The smooth transition is provided by the intensity value, fading the effect in and out.

FIG. 10 is a block schematic diagram of a computer system 1000 to implement a device having a screen to which a three dimensional appearing effect is applied according to example embodiments. All components need not be used in various embodiments. One example computing device in the form of a computer 1000, may include a processing unit 1002, memory 1003, removable storage 1010, and non-removable storage 1012. Processing unit 1002 in one embodiment may include a graphics co-processor that performs operations on a programmable pipeline that applies the animation to one or more display surfaces created by programs running on the device. Although the example computing device is illustrated and described as computer 1000, the computing device may be in different forms in different embodiments. For example, the computing device may instead be a smartphone, a tablet, smartwatch, or other computing device including the same or similar elements as illustrated and described with regard to FIG. 10. Devices such as smartphones, tablets, and smartwatches are generally collectively referred to as mobile devices. Further, although the various data storage elements are illustrated as part of the computer 1000, the storage may also or alternatively include cloud-based storage accessible via a network, such as the Internet.

Memory 1003 may include volatile memory 1014 and non-volatile memory 1008. Computer 1000 may include— or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the computer 1000, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable storage device are executable by the processing unit 1002 of the computer 1000. A hard drive, CD-ROM, and RAM are some examples of articles including a non-transitory computer-readable medium such as a storage device. The terms computer-readable medium and storage device do not include carrier waves. For example, a computer program 1018 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1000 to provide generic access controls in a COM based computer network system having multiple users and servers.

The following non-limiting examples illustrate various combinations of embodiments.

Example 1 includes a method including dividing a display of an electronic device into multiple regions defined by vertices, calculating time varying positions for each vertex relative to a horizon in time, and composing a screen for the display that includes the time varying positions for each vertex to create an animated display distortion.

Example 2 includes the method of example 1 wherein composing the screen comprises adding the time varying positions for each vertex to a surface generated by an application running on the electronic device.

Example 3 includes the method of any of examples 1-2 wherein the time varying positions for each vertex are calculated to provide a visual wave effect in association with haptic effects.

Example 4 includes the method of any of examples 1-3 wherein the varying positions vary between enlarged and shrunken, creating a distortion in the display.

Example 5 includes the method of example 4 wherein creating varying positions utilizes a piston rod sin function.

Example 6 includes the method of example 5 wherein a length of the piston rod is varied over time.

Example 7 includes the method of example 6 wherein the length of the piston rod is varied over time in accordance with a Perlin noise pattern using a turbulence function calculated from four frequencies of noise.

Example 8 includes the method of example 7 wherein a mapping between pistons and the noise pattern shifts across the screen to create a wave effect.

Example 9 includes the method of any of examples 1-8 and further comprising transitioning the animated display distortion on and off in accordance with an intensity value.

Example 10 includes a machine readable storage device having instructions for execution by a processor to cause the machine to perform operations including dividing a display of an electronic device into multiple regions defined by vertices, calculating time varying positions for each vertex relative to a z dimension, and composing a screen for the display that includes the time varying positions for each vertex to create an animated display.

Example 11 includes the machine readable storage device of example 10 wherein the operations for composing the screen comprise adding the varying positions for each vertex to a surface generated by an application running on the electronic device.

Example 12 includes the machine readable storage device of any of examples 10-11 wherein the time varying positions for each vertex are calculated to provide a visual wave effect in association with haptic effects.

Example 13 includes the machine readable storage device of any of examples 10-12 wherein the varying positions vary between enlarged and shrunken, creating a distortion in the display in association with haptic effects.

Example 14 includes the machine readable storage device of example 13 wherein creating varying positions utilizes a piston rod sin function.

Example 15 includes the machine readable storage device of example 14 wherein a length of the piston rod is varied over time in accordance with a Perlin noise pattern using a turbulence function calculated from four frequencies of noise.

Example 16 includes a device having a processor, a display coupled to the processor, and a memory device coupled to the processor and having a program stored thereon for execution by the processor to perform operations. The operations include dividing the display into multiple regions defined by vertices, calculating time varying positions for each vertex relative to a z dimension, and composing a screen for the display that includes the time varying positions for each portion to create an animated display distortion.

Example 17 includes the device of example 16 wherein composing the screen comprises adding the time varying positions for each vertex to a surface generated by an application running on the electronic device.

Example 18 includes the device of any of examples 16-17 wherein the varying positions vary between enlarged and shrunken, creating a distortion in the display.

Example 19 includes the device of any of examples 16-18 wherein creating varying positions utilizes a piston rod sin function.

Example 20 includes the device of any of examples 16-19 wherein a length of the piston rod is varied over time in accordance with a Perlin noise pattern using a turbulence function calculated from four frequencies of noise.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
    dividing a display of an electronic device into multiple regions defined by vertices, each vertex corresponding to a screen pixel position of the display;
    calculating time varying positions for each vertex using a noise function;
    composing a screen for the display that includes the time varying positions for each vertex to create an animated display distortion; and
    transitioning the animated display distortion on and off in accordance with an intensity value.

2. The method of claim 1 wherein composing the screen comprises adding the time varying positions for each vertex to a surface generated by an application running on the electronic device.

3. The method of claim 1 wherein the time varying positions for each vertex are calculated to provide a visual wave effect in association with haptic effects.

4. The method of claim 1 wherein the varying positions vary between enlarged and shrunken, creating a distortion in the display.

5. The method of claim 4, wherein the calculating of the time varying positions utilizes a piston rod for each vertex.

6. The method of claim 5, further comprising varying lengths of the piston rods over time.

7. The method of claim 6 wherein the varying of the lengths of the piston rods comprises varying the lengths of the piston rods in accordance with a Perlin noise pattern using a turbulence function calculated from four frequencies of noise.

8. The method of claim 7 wherein a mapping between pistons and the Perlin noise pattern shifts across the screen to create a wave effect.

9. A machine readable storage device having instructions for execution by a processor to cause the machine to perform operations comprising:
    dividing a display of an electronic device into multiple regions defined by vertices, each vertex corresponding to a screen pixel position of the display;
    calculating time varying positions for each vertex using a noise function; and
    composing a screen for the display that includes the time varying positions for each vertex to create an animated display; and
    transitioning the animated display distortion on and off in accordance with an intensity value.

10. The machine readable storage device of claim 9 wherein the operations for composing the screen comprise adding the varying positions for each vertex to a surface generated by an application running on the electronic device.

11. The machine readable storage device of claim 9 wherein the time varying positions for each vertex are calculated to provide a visual wave effect in association with haptic effects.

12. The machine readable storage device of claim 9 wherein the varying positions vary between enlarged and shrunken, creating a distortion in the display in association with haptic effects.

13. The machine readable storage device of claim 12 wherein the creating of the varying positions utilizes a piston rod for each vertex.

14. The machine readable storage device of claim 13, wherein the operations for calculating time varying positions for each vertex further comprise varying lengths of the piston rods over time in accordance with a Perlin noise pattern using a turbulence function calculated from four frequencies of noise.

15. A device comprising:
    a processor;
    a display coupled to the processor; and
    a memory device coupled to the processor and having a program stored thereon for execution by the processor to perform operations comprising:
    dividing the display into multiple regions defined by vertices, each vertex corresponding to a screen pixel position of the display;
    calculating time varying positions for each vertex using a noise function;
    composing a screen for the display that includes the time varying positions for each vertex to create an animated display distortion; and
    transitioning the animated display distortion on and off in accordance with an intensity value.

16. The device of claim 15 wherein composing the screen comprises adding the time varying positions for each vertex to a surface generated by an application running on the device.

17. The device of claim 15 wherein the varying positions vary between enlarged and shrunken, creating a distortion in the display in association with haptic effects.

18. The device of claim 15, wherein the calculating of the varying positions utilizes a piston rod sine function for each vertex.

19. The device of claim 18, further comprising varying lengths of the piston rods over time in accordance with a Perlin noise pattern using a turbulence function calculated from four frequencies of noise.

* * * * *